(12) United States Patent
Kelly

(10) Patent No.: US 8,644,962 B2
(45) Date of Patent: Feb. 4, 2014

(54) ADAPTIVE CONTROL SYSTEM

(75) Inventor: Anthony Kelly, Monanooag Old Kildimo (IE)

(73) Assignee: Powervation Limited, Limerick (IE)

(*) Notice: Subject to any disclaimer, the term of this patent is extended or adjusted under 35 U.S.C. 154(b) by 260 days.

(21) Appl. No.: 12/439,802

(22) PCT Filed: Feb. 14, 2008

(86) PCT No.: PCT/EP2008/051818
§ 371 (c)(1),
(2), (4) Date: Mar. 3, 2009

(87) PCT Pub. No.: WO2008/101864
PCT Pub. Date: Aug. 28, 2008

(65) Prior Publication Data
US 2010/0057223 A1    Mar. 4, 2010

(30) Foreign Application Priority Data

Feb. 21, 2007 (IE) .................................... 2007/0115

(51) Int. Cl.
*G05B 13/02* (2006.01)
*G05F 5/00* (2006.01)
*G05F 1/10* (2006.01)

(52) U.S. Cl.
USPC .................. 700/28; 700/37; 700/44; 700/55; 323/207; 323/234

(58) Field of Classification Search
USPC .................. 700/282, 8–9, 28, 32, 37, 41–45; 323/234, 207
See application file for complete search history.

(56) References Cited

U.S. PATENT DOCUMENTS

| | | | | |
|---|---|---|---|---|
| 5,357,421 A | * | 10/1994 | Tautz et al. | 700/4 |
| 2003/0074166 A1 | | 4/2003 | Jackson | |
| 2005/0206358 A1 | * | 9/2005 | Van Der Horn et al. | 323/282 |
| 2006/0091871 A1 | * | 5/2006 | Abedinpour et al. | 323/283 |
| 2006/0276915 A1 | | 12/2006 | Kelly | |
| 2007/0142932 A1 | * | 6/2007 | Stewart | 700/20 |

FOREIGN PATENT DOCUMENTS

JP    06 22839 A    8/1994

OTHER PUBLICATIONS

Rubaii, Hardware Implementation of an Adaptive Network-Based Fuzzy Controller for DC-DC Converters, IEEE, 2005.*

* cited by examiner

*Primary Examiner* — Kavita Padmanabhan
*Assistant Examiner* — Darrin Dunn
(74) *Attorney, Agent, or Firm* — Hickman Palermo Truong Becker Bingham Wong LLP

(57) ABSTRACT

The present application provides an adaptive control system for controlling a plant in particular a DC-DC power converter. The control system has two controllers of differing characteristics. The output of the individual controllers $H_0$ and $H_1$ are combined together to provide a combined control signal H to the plant, where $H=\alpha H_1+(1-\alpha)H_0$ and where the adaptive control system is tuned by adjusting the value of $\alpha$ between 0 and 1 to find an optimum control position.

18 Claims, 8 Drawing Sheets

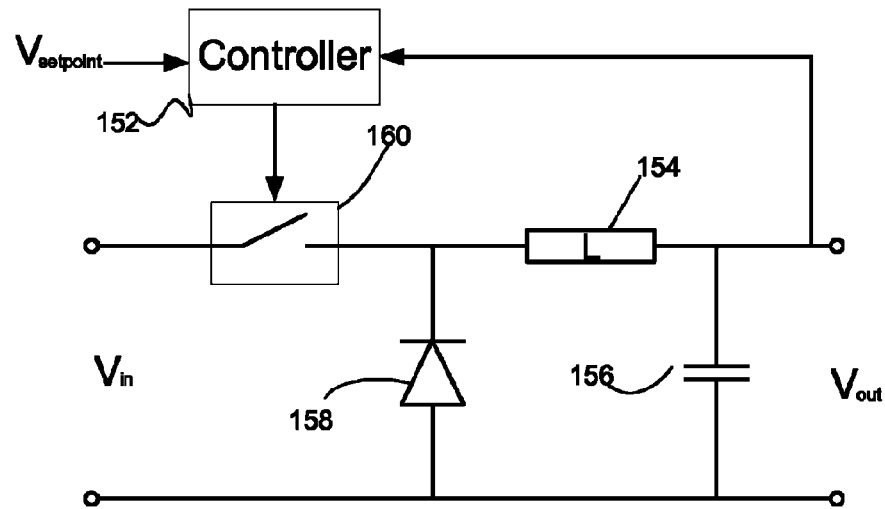
Fig. 8    150
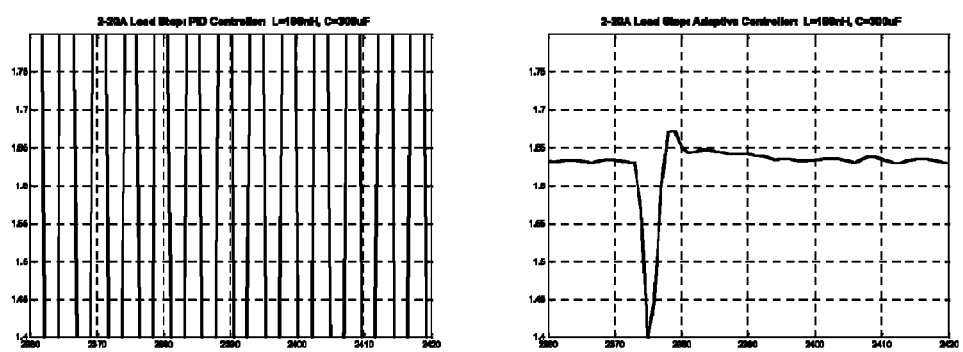
Fig. 9

ADAPTIVE CONTROL SYSTEM

FIELD OF THE APPLICATION

The present application relates to feedback control systems generally and in particular to adaptive control systems.

BACKGROUND OF THE APPLICATION

A variety of different feedback control systems are known, including on-off control and proportional (P) control in which the controller output is proportional to the error between the system set point and the measured system output.

A problem with proportional control systems is that they can tend to oscillate and that the control output is always in direct proportion to the error. To resolve these problems and others many feedback control schemes include mathematical extensions to improve performance. The most common extensions are proportional-integral-derivative (PID) type control systems.

In PID control systems, the derivative (D) part is concerned with the rate-of-change of the error with time: If the measured variable approaches the setpoint rapidly, then the actuator is backed off early to allow it to coast to the required level. Derivative action makes a control system behave much more intelligently. The integral (I) term magnifies the effect of long-term steady-state errors, applying ever-increasing effort until they reduce to zero. In a PID controller, separate parameters for the P, I and D elements are employed. Typically, these parameters would be determined at a design stage or during an initial commissioning of a control system. A difficulty with these systems is that whilst the determined parameters for a PID controller might be optimum at the time of commissioning or design of a controller, the characteristics of a system may change over time. In other cases, the characteristics of the system may only be known with a low accuracy, and therefore controller design is likely to be suboptimal.

To address this, adaptive control may be employed. Generally, adaptive control relies upon determination of a system's characteristics and designing the correct controller for these characteristics. Suitably, the determination of the system characteristics and the design of the controller happens in real-time and on-the-fly as the system is running. In general there are two methods of adaptive control which differ according to how the system parameters are estimated: Parametric and Non Parametric Non-Parametric methods estimate the system parameters by measuring something about the system such as its step response or frequency response, and then employ this data to design the correct controller. On the positive side, these methods are relatively non-complex and intuitive. However, on the negative side they are known to be sensitive to noise, interference and other non-idealities which can make for a poor controller design, and they cannot work on-line continuously because you need to make the required measurements to determine the system parameters. A basic prior art non-parametric method is illustrated in FIG. 1. In this scheme the system is subject to relay control during a calibration cycle, where key parameters of the loop are determined. In common with non-parametric methods in general, this method has several drawbacks including that the regulation of the loop is disturbed during the tuning procedure. The identification of high frequency characteristics is sensitive to noise and therefore the method is inaccurate in the most important frequency range.

Parametric methods incorporate a model of the system and estimate the correct system parameters using adaptive methods. On the positive side, this method can work on-line and is insensitive to noise. But on the negative side, it's very complex and costly to implement as the computing power required to perform the calculations on a fast process would be expensive. As a result, parametric methods are generally employed in slower systems and thus for example are popular in process control, e.g. in chemical plants where the system response times may be minutes or hours rather than fractions of a second.

The parametric method will now be described with reference to an exemplary self-tuning regulator 10, shown in FIG. 2, consisting of a controller 12 and a plant 14, whereby the parameters of the plant are estimated by the 'plant parameter estimation' block 16. The estimated parameters are used as inputs to the 'controller design' block, to determine the correct parameters for the controller. The estimation of plant parameters is a system identification problem.

System identification is broadly concerned with modelling dynamic systems using measured experimental data. In general terms system identification relies upon parameter estimation which may employ parametric or non-parametric methods. Parametric methods require an adaptive filter for implementation.

Parameter estimation is a fundamental part of system identification. It uses a model to relate the measured data to the unknown parameters. The general relationship, where w is a vector of unknown parameters, u(n) is a vector of data applied to the system, and y(n) is the output is shown in equation (1):

$$y(n)=u(n)w \tag{1}$$

The model used for parameter estimation does not need to be the same as the control model. The only requirement is that the measured data is linearly related to the parameters via the model. Re-parameterisation of the model is possible by applying a stable filter to both the input and output data. Any linear system can be written as equation (1) using this method of re-parameterisation. This method underlies the formulation of the direct form of the self-tuning regulator described above.

The goal of the parameter estimation algorithm is to minimise the prediction error, i.e. the difference between the estimated values of the output of the system and the actual values.

This is achieved by modifying the parameter estimates iteratively so as to minimise the prediction error so that the parameters of the estimator and the Plant ultimately match. The operation is illustrated in FIG. 3, where the plant 24 and the estimator 26 are driven by the same signal u(n). The desired response of the estimator designated y(n), is the same as the plant in this case (though it need not be). The estimation error pe(n) is simply the difference between the desired response y(n) and the actual response of the estimator ŷ(n).

Methods for implementing the parameter estimator and the mechanism 28 for updating the parameters come from the field of adaptive filter design.

Practical online adaptive controllers such as the self-tuning regulator have relied upon parameter estimation to identify the parameters of the plant, operating under the assumption of certainty equivalence, whereby the estimated plant parameters are treated as the true values for the purposes of controller design. Such an approach requires accurate estimation, in the shortest possible time, and therefore requires computationally complex adaptive filters. Accordingly, this makes the traditional approach unsuitable for a low-cost control applications.

The present application seeks to provide an adaptive control method which employs a parametric type approach which is suitable for low-cost control applications.

The present application is therefore directed towards providing an improved control system addressing at least some of the above problems.

SUMMARY

Accordingly, the present application provides control systems and a method. Advantageous features, variations and embodiments are provided in dependent claims.

According to the invention, there is provided a control system for controlling a plant, the control system comprising a plurality of controllers of differing characteristics, the controllers comprising at least one parameter configured to control the plant, the controllers operating with common state variables, and a means for processing the controller outputs to provide a control signal output to the plant.

In one embodiment, the processing means sums the controller outputs according to a dynamically varying tuning value.

In another embodiment, there are at least two controllers $H_0$ and $H_1$, and the processing means sums the controller outputs $H_0$ and $H_1$, according to:

$$H=\alpha H_1+(1-\alpha)H_0$$

in which H is the control signal output.

In a further embodiment, the system further comprises means for tuning at least one parameter of the controller by minimising the mean square value of a signal in the control loop.

In one embodiment, the processing means dynamically modifies the tuning value according to the weighting of an adaptive filter which is updated by an update mechanism.

In another embodiment, the update mechanism operates on the basis of LMS.

In a further embodiment, the update mechanism operates on the basis of RLS.

In one embodiment, the adaptive filter weighting starts at 0 and is adjusted between 0 and 1.

In another embodiment, the adaptive filter minimises prediction of a control error.

In a further embodiment, the processing means comprises an MA controller for placing the zeros of the controller transfer function, In one embodiment, the processing means comprises an AR controller for placing the poles of the controller transfer function.

BRIEF DESCRIPTION OF THE DRAWINGS

The application will be more clearly understood from the following description of some embodiments thereof, given by way of example only with reference to the accompanying drawings in which:—

FIG. 8 is a schematic diagram of an exemplary power converter according to a further embodiment of the present application, FIGS. 9 to 11 are plots illustrating various aspects of operations of the self-adjusting control loop and FIG. 12 illustrates a possible modification to FIG. 6.

DETAILED DESCRIPTION OF THE DRAWINGS

The present application describes an approach to adaptive parametric control which whilst providing the benefits of parametric control does so with a low complexity; which is some instances may even be lower than non-parametric methods. In this method, the plant parameters may not be identified explicitly, as they are in the self-tuning regulator and thus the method may be regarded as an indirect one.

The adaptive controller of the present application may be considered a parametric method because the correct parameters of the controller are found by the algorithm in situ (or under closed loop operation). No assumptions are made about the nature of noise or other interference in the loop. Nonetheless these are taken into account when optimising the control parameters.

Previous approaches, as described above, in digital power control have implemented non-parametric methods, and therefore make assumptions about the system and "hope for the best" in trying to evaluate the correct control parameters e.g. Break the feedback loop, inject noise into the plant, perform an FFT to get a frequency plot of the plant and correlate the findings back into the controller before closing the loop again. The present method obviates the need for this.

In greater detail, the present application provides a control system with a self-adjusting control loop, which adjusts its compensation in response to on-line measurements, such that the control loop is properly compensated over a wide range of component variation and tolerances in the plant under control. Adjusting the compensation of the loop in this way provides superior loop performance compared to a fixed controller.

The control loop adjusts a controller which the user may design, addressing the need for users to have confidence in the control scheme, and allowing flexibility in the type and initial parameters of the required controller.

Being a parametric method, the self adjusting control loop is relatively insensitive to the influence of noise.

Figure 1:
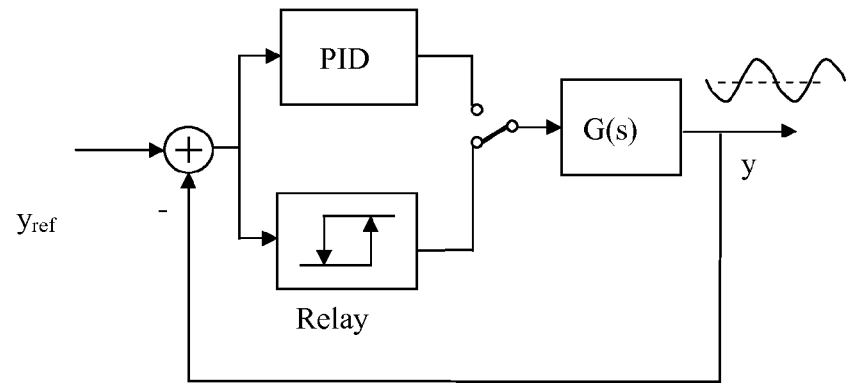
FIG. 1 is a prior art control system.
Figure 2:
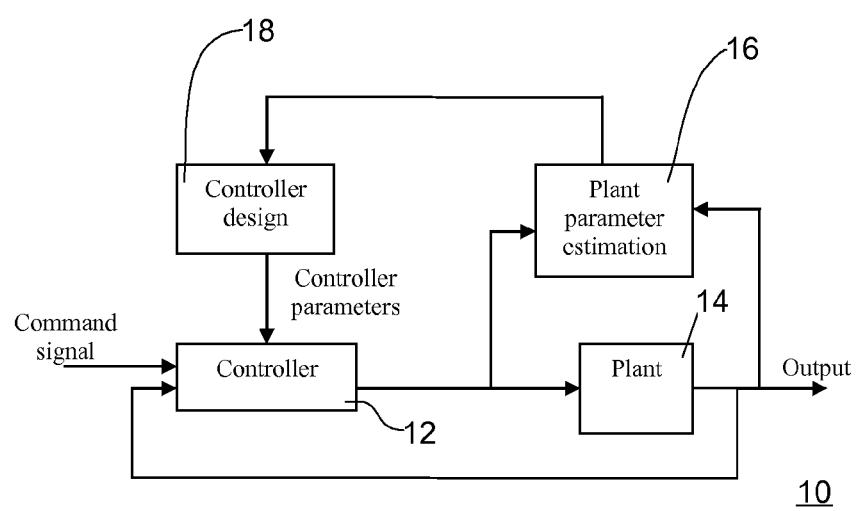
FIG. 2 is a further example of a prior art control system.
Figure 3:
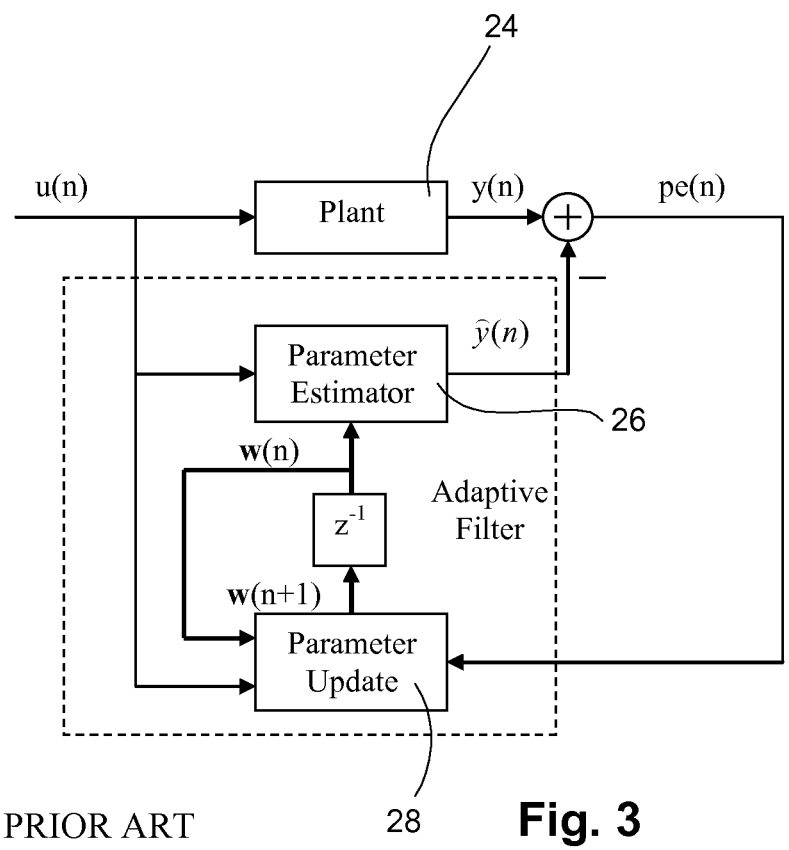
FIG. 3 is a prior art schematic diagram of a parameter estimator
Figure 4:
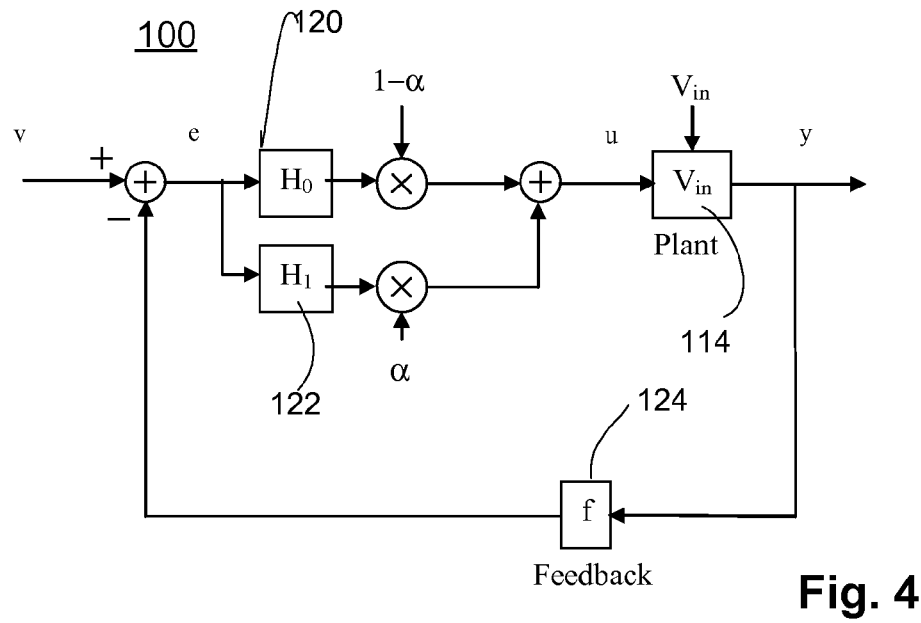
FIG. 4 is a schematic diagram of a control system of the present application.

Referring to FIG. 4, a self-adjusting (adaptive) control loop 100 has two controllers $H_0$ 120 and $H_1$ 122 which contain common state variables. The two controllers, $H_0$ and $H_1$, are suitably designed to perform well at different ranges of plant parameters. It will be appreciated that these controllers may be pre-designed based on an estimation of the plant parameters or alternatively set during commissioning of the plant 114 by experiment. For example, the first controller $H_0$ may be designed conservatively, to give good performance at the critical corner of variation in plant parameters. With regard to the exemplary buck converter of FIG. 8, a controller would be designed using the minimum expected values of the L and C. Similarly, the second controller H1 may be designed for high performance at the upper end of variation in plant parameters. The controllers $H_0$, $H_1$ may each be a PID type controller. In contrast to prior art adaptive controllers, the relative relationship between the P, I and D gain coefficients of the individual controllers remain unchanged during plant operation. It will be appreciated that other types of controllers such as PD or PI may be employed as appropriate with a corresponding argument about the relative relationship between coefficients.

Instead of tuning each of the individual P, I or D values in a controller, the present application tunes a single parameter ($\alpha$) which adjusts the balance between the combined output u, by applying a different scaling factor ($1-\alpha$, $\alpha$) to each, of two controllers as illustrated in FIG. 4. More particularly, the self-adjusting control loop sums the outputs of the controllers $H_0$ and $H_1$ in a summer in proportion to a tuning value $\alpha$ according to the following equation:

$$H = \alpha H_1 + (1-\alpha) H_0 \qquad (2)$$

This allows a linear continuum of controllers between $H_0$ and $H_1$ to be realised as $\alpha$ varies between zero and one. In effect, the output control signal from each controller is gain scaled, and the gain scaled outputs summed together. The scaling factors applied to each control signal are however balanced, so that when the scaling factor applied to the first control signal is reduced, the scaling factor applied to the second control signal is increased by a corresponding amount and vice versa.

A feedback element 124 may be placed in the feedback path from the output to condition the measured output to correspond to the setpoint as is commonplace in the prior art. Thus for example, if the plant parameter being controlled was a temperature, then the signal from a temperature sensor measuring this output might be suitably conditioned to provide a voltage signal with an appropriate range.

The method of self adjusting control is as follows. The tuning value $\alpha$ starts at a suitable value to ensure stability. Zero may be a suitable choice, meaning that the control signal from the first controller $H_0$ is controlling the plant with no contribution from the second controller. Suitably, the first controller may be selected to be a conservative controller. Conversely, if the tuning value $\alpha$ starts at one, the control signal from the second controller $H_1$ would be controlling the plant with no contribution from the first controller. The adaptive element of the control system adjusts the value of $\alpha$ to determine an optimum balance point between the two control systems. The value of $\alpha$ is determined by an adaptive filter update mechanism employing a suitable function such as least mean square (LMS) or recursive least square (RLS) to determine an optimum operating position. The adaptive weighting, starting suitably at zero, adjusts between zero and one such that a controller corresponding to an optimal prediction of the control error is achieved.

The control loop 100 adjusts the controller parameters to achieve good control over a wide range of plant component variations, providing much better control and regulation compared to a fixed controller. Also the controllers being adjusted between ($H_0$ and $H_1$), may be designed and specified by the user according to their needs, providing the user with flexibility to match their application and confidence in the controller being applied.

Figure 5:
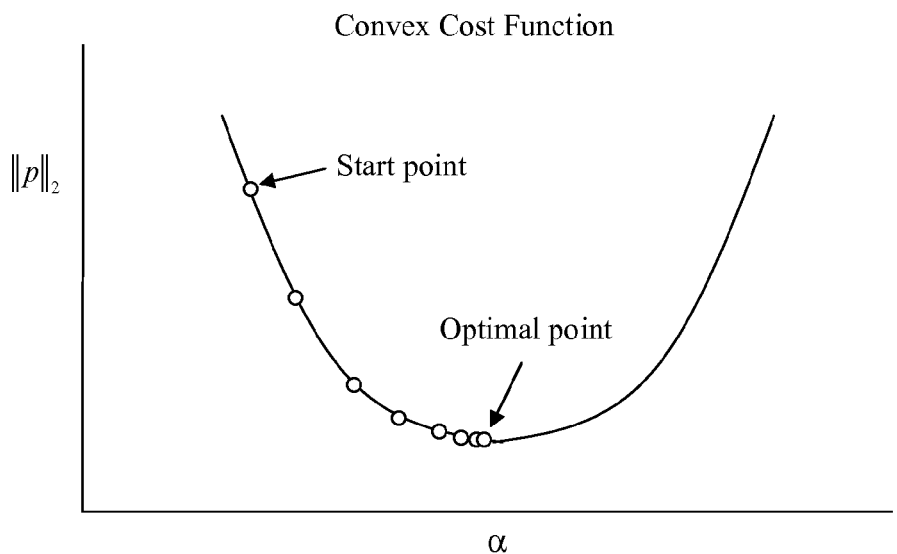
FIG. 5 is a cost function illustrating the operation of the control system of FIG. 4.

The method of starting with the most conservative controller, $H_0$, means that the method is robust at startup, tuning up to the most appropriate controller between $H_0$ and $H_1$ according to the tuning value $\alpha$. Advantageously, the individual controller coefficients (e.g. PID) may be selected to provide stable controllers. Since these coefficients are not adjusted the overall controller is inherently stable in contrast to other adaptive controllers where the P, I and D coefficients may be individually tuned, which in certain circumstances may produce instability. It will be appreciated that this argument also applies in general, where the coefficients correspond to poles, zeros and gain of the controller The tuning value, $\alpha$, is the weighting of an adaptive filter which optimises p(n), as illustrated in FIG. 5. The power of signal p(n) may be interpreted as being representative of the quality of regulation in the loop. As such, minimising the mean square value of p(n) corresponds to optimal tuning of the regulator. Computing the tuning value, $\alpha$, in this way yields a robust tuning mechanism which is more insensitive to noise and of very low computational complexity.

Figure 6:
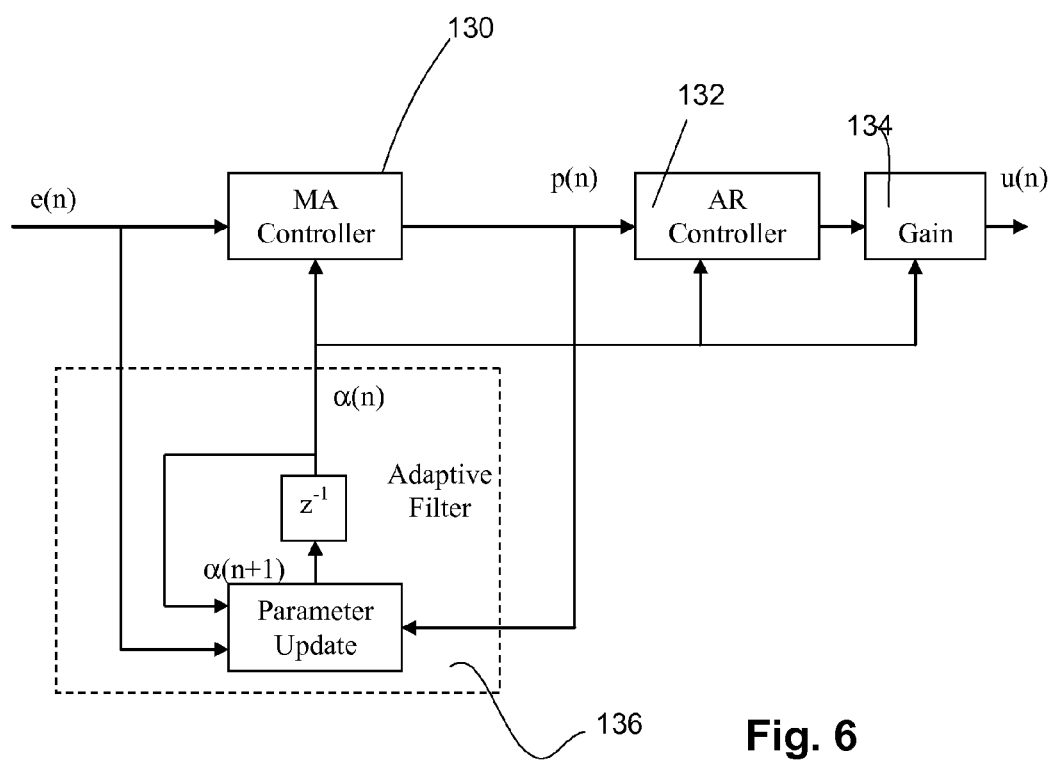
FIG. 6 is a schematic diagram of a self-adjusting controller of the system, illustrating the updating of the tuning value, $\alpha$.

Although, the adaptive control system above has been explained with reference to distinct controllers, it will be appreciated that two control functions may equally be combined into one controller in which there is a single tuning parameter $\alpha$ which adjusts the balance ($\alpha$, $1-\alpha$) between the two control functions, providing one degree of freedom in tuning. An example of such an implementation is shown in FIG. 6, in which the control scheme effectively splits the calculation of the zeros/poles of two control functions combined within a single controller into two halves (standard controllers lump both zeros/poles of the feedback controller together). The controller comprises a Moving Average Filter 130, an Auto Regressive filter 132 and a gain element 134.

The portion 130 of the controller up to node p(n),

1. Implements a moving average (MA) filter implementing the zeros of the controller.

2. The adaptive portion 136 of the feedback loop then works in minimizing p(n) which is equivalent to minimizing the energy in the control error e(n), which is obviously the goal of regulation. The role of the adaptive portion of the controller is to travel the Convex Cost function until the optimum point is reached. So— a) The adaptive filter drives the tuning value (alpha) towards the optimal point along the gradient of the convex cost function (FIG. 5)

b) The optimum point is reached when the Euclidian norm (or energy) of the signal p(n) is minimum.

3. The resulting $\alpha$ value is the weighting function used to update the MA, Auto Regressive (AR) filter 132 and Gain coefficients 134 of the overall controller into the next power stage switching cycle. It will be appreciated that there is a linear relationship between the value of $\alpha$ and the values of the MA, AR and Gain coefficients since it is merely balancing two control functions which have been combined together in the MA, AR and Gain blocks.

From node p(n) onwards the AR filter implements the poles of the system ensuring stable operation. The gain block ensures adequate transient performance is achieved but not in excess or danger of going out of control.

It will be appreciated that whilst there is only one controller in FIG. 6, two control functions are implemented and only one parameter ($\alpha$) is tuned and employed in adjusting the controller coefficients in the MA, AR and Gain elements.

Figure 12:
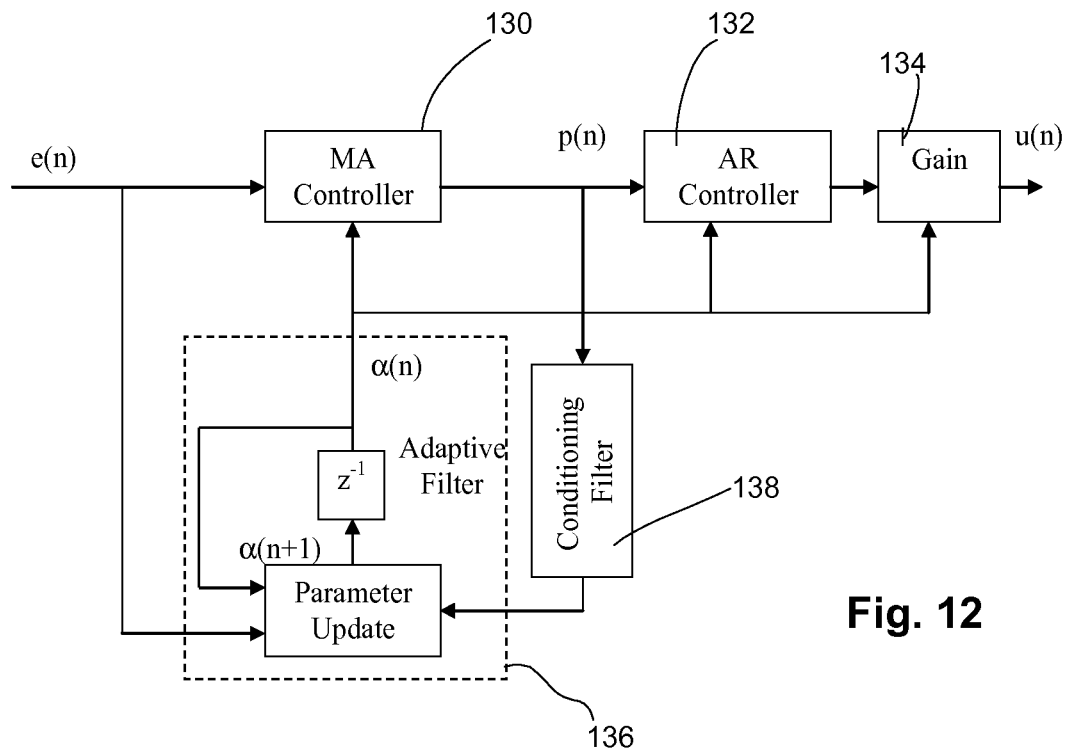

Additional signal conditioning is possible by filtering the relevant adaptive signals using a signal conditioner 138 as illustrated in FIG. 12. By adding the signal conditioning filter to the adaptive loop but not to the control loop, the transfer function optimised by the adaptive filter is different from the transfer function of the control loop. Such conditioning permits some flexibility in relation to the adaptive tuning, allowing the user to influence the control system's final compensation. For example, referring to FIG. 12, designating the controller and conditioning filter's transfer functions as C(z) and D(z) respectively, we can write an equation for the optimised control function F(z) as:

$$F(z) = C(z) \cdot D(z)$$

Rearranging for the controller's transfer function:

$$C(z) = \frac{F(z)}{D(z)}$$

which clearly shows that the conditioning filter's response, D(z), influences the optimised (or converged) transfer function of the controller C(z).

The ability to tune many controller parameters from a single tuning value affords an advantage over adaptive controllers which must compute several tuning values independently. Using several independently tuned values allows the controller several degrees of freedom to find the optimal control values, and therefore the control values may specify an unstable controller when the control values are mistuned under the influence of noise or other non-idealities. Tuning the controller from a single tuning value according to the teachings of this application provides one degree of freedom in tuning and constrains the controller to operate over a range of parameters which are less likely to yield an unstable control system under mistuning conditions. This ability to operate over a range of parameters and its inherent greater stability even in mistuning conditions makes the present adaptive controller very robust in application.

The control loop includes at least two pre-designed controllers, $H_0$ and $H_1$, whereby the control signal to the plant is derived from a sum of the outputs of the two controllers according to equation (2). More specifically, the controllers' state evolution may be described using state-space notation as follows.

When $\alpha$ equals zero:

$$x(n+1) = A_0 x(n) + B_0 e(n) \qquad (3)$$

where $A_0$ is the state matrix of controller $H_0$, $B_0$ is the input matrix of the controller $H_0$, x is the state vector, containing the controller state variables and e is the controller input vector.

When $\alpha$ equals one:

$$x(n+1) = A_1 x(n) + B_1 e(n) \qquad (4)$$

where $A_1$ is the state matrix of controller $H_1$, $B_1$ is the input matrix of the controller $H_1$, x is the state vector, containing the controller state variables and e is the controller input vector.

From equations (2-4), it follows that for all values of a between zero and one:

$$x(n+1) = [(1-\alpha)A_0 + \alpha A_1]x(n) + [(1-\alpha)B_0 + \alpha B_1]e(n) \qquad (5)$$

Therefore, combining the controllers $H_0$ and $H_1$ allows a continuum of controllers between $H_0$ and $H_1$ to be realised as Alpha varies between zero and one.

It will be clear to those skilled in the art that the controllers do not have to be implemented as explicitly separate controllers. Referring to equation (5) it is clear that the square-bracketed terms from left to right represent the state matrix and input matrix respectively of a combined controller according to the present application, where the matrices vary as a function of Alpha, and furthermore that when the controller is implemented in a digital form, the controller may be more efficiently implemented in this way. Hence the term "plurality of controllers" does not necessarily mean that they are physically separate.

It is also clear from equation (5) that on-line computation involving $\alpha$ can be reduced by collecting terms involving $\alpha$. For example the state matrix of equation (5) can be re-written as:

$$A_0 + \alpha(A_1 - A_0) \qquad (6)$$

which reduces the online computation of the state matrix to a vector add and multiply.

Figure 7:
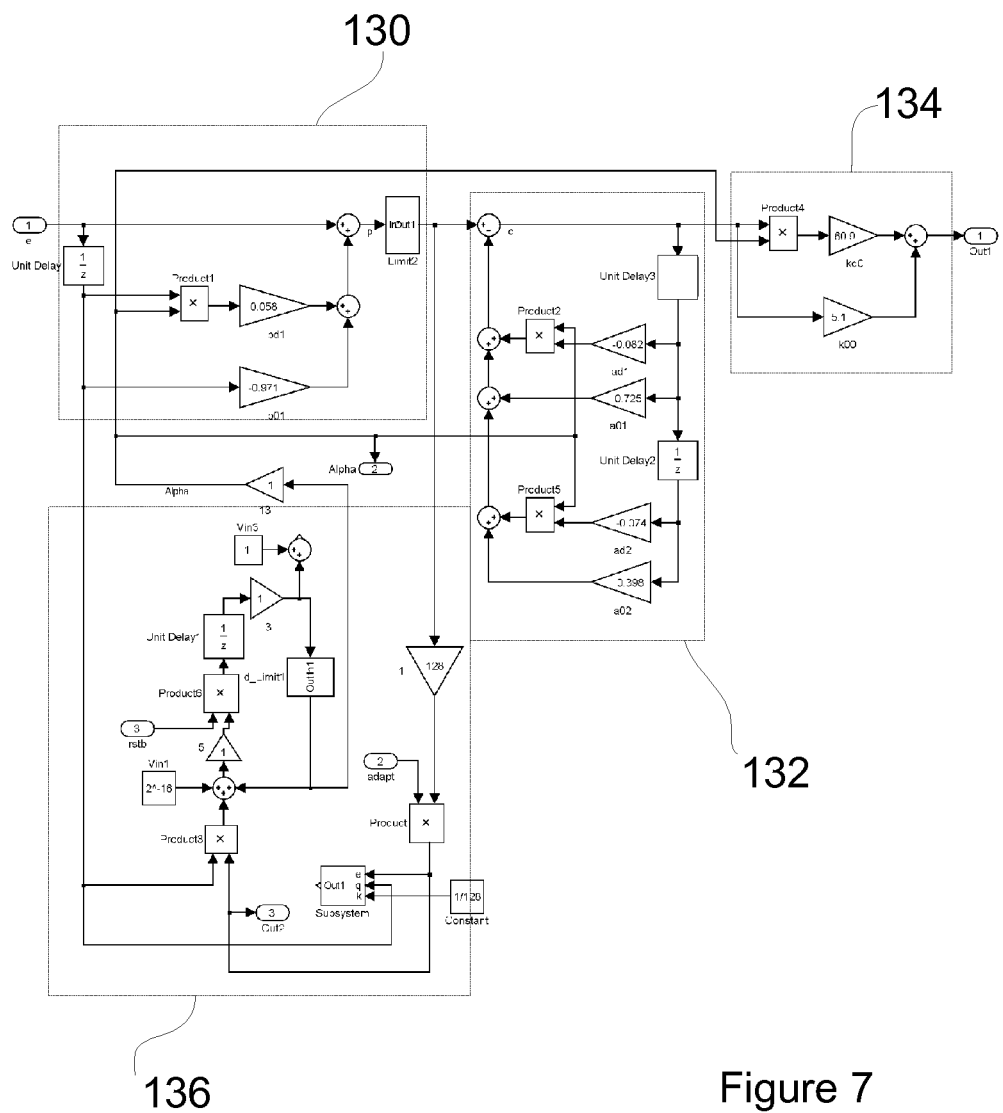
FIG. 7 is a detailed diagram of an implementation of the self-adjusting controller of FIG. 6.

FIG. 7 shows an exemplary implementation according to the teachings of the present application on a one zero two pole controller using an LMS adaptive filter for the weight updates. It can be seen that the implementation is in the form of a single controller, realising the two control functions, which has been simplified in hardware by using the techniques described above in equations (5) and (6). Furthermore, the individual functional blocks which were outlined explicitly in FIG. 6, have been identified.

The method is particularly attractive to digital control loops within power converter control circuits where low cost and insensitivity to noise are desirable. Power converters such as switching DC-DC converters are employed in electronic devices where different voltages and\or polarities of voltage are required from a single voltage supply such as battery. The control method described above may be advantageously employed in controllers employed to control the operation of these DC-DC converters. Although DC-DC controllers have typically been analogue in nature, digital controllers have become popular for several reasons such as greater feature integration, more sophisticated loop control and greater flexibility.

An exemplary DC-DC converter 150 employing a controller 152 using the present method is shown in FIG. 8. The exemplary DC-DC converter is a Buck converter which is a converter for stepping down one DC voltage to a lower DC voltage. However, the control method may equally be used in other types of switching DC-DC converters including for example but not limited to boost (step-up) converters, buck-boost converters, cuk converters, flyback converters and forward converters.

In the exemplary buck converter a voltage ($V_{in}$) is switchably supplied from a voltage source to an inductor 154 capacitor 156 arrangement which stores energy and provides it as an output voltage $V_o$. A diode 158 is used to provide a path for inductor current when the switch is closed. The output voltage is determined by the relative time the switch 160 is open and closed, this is generally referred to as the duty cycle. The controller acts to try and maintain the output voltage at a desired set point voltage by varying the duty cycle.

Figure 10:
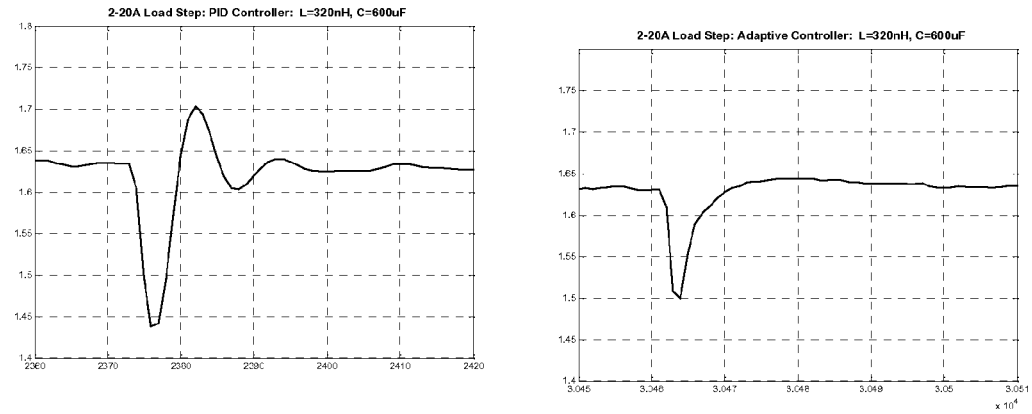
Figure 11:
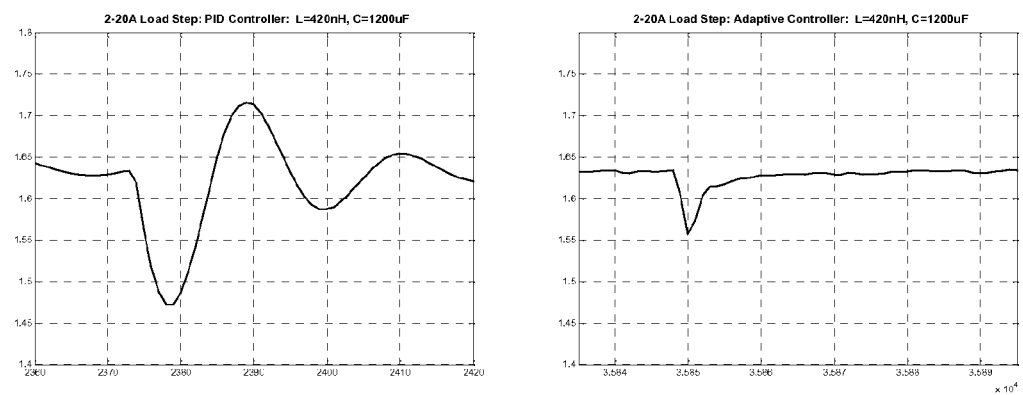

The improvement afforded by the self adjusting control loop is shown below where FIG. 9 to FIG. 11 compares the load step regulation of a DC to DC converter designed according to this application compared to a standard fixed controller for various values of inductor and capacitor; where the performance of the standard fixed controller is shown in the leftmost diagrams, and the performance of the self adjusting control loop is shown on the right.

FIG. 9 shows that for low values of L and C the standard fixed control loop is unstable whilst the self adjusting control loop is stable, illustrating the wider operating range which is possible using the self adjusting control loop.

FIGS. 10 and 11 show performance with increasing values of L and C. Note that the standard fixed control loop exhibits a deteriorating dynamic response, becoming more oscillatory as the L and C increase. Whereas the self adjusting control loop re-compensates the loop, demonstrating superior dynamic response.

The application is not limited to the embodiments described but may be varied in construction and detail. In particular, whilst the controller has been described with reference to just two controllers, further controllers could be included.

The words comprises/comprising when used in this specification are to specify the presence of stated features, integers, steps or components but does not preclude the presence or addition of one or more other features, integers, steps, components or groups thereof.

The invention claimed is:

1. An adaptive control system for controlling a DC-DC converter to provide a constant output, the adaptive control system comprising: a plurality of non-adaptive controllers each of the individual non-adaptive controllers responsive to at least one common input, each individual controller having a distinct control function and providing an output suitable for controlling the output of the DC-DC converter, wherein the outputs from the non-adaptive controllers are individually scaled by scaling values and summed together to provide a weighted sum control signal output to control the output of the DC-DC converter where the sum of the scaling values is maintained constant, wherein the adaptive control system further comprises a tuner for adjusting the individual scaling values in an effort to determine an optimum balance between the non-adaptive controllers and wherein the tuner determines the scaling values by minimizing a mean square value of a signal in the control system.

2. A control system according to claim 1, wherein the control function of each of the individual feedback controllers is fixed.

3. A control system as claimed in claim 1, wherein the individual scaling values are determined with a single degree of freedom.

4. A control system as claimed in claim 1, wherein there are two controllers with controller outputs H0 and H1, and the weighted sum control signal output H is given by where is a value between 0 and 1.

5. A control system as claimed in claim 4, wherein the value of $\alpha$ is continuously adjusted in the range between 0 and 1.

6. A control system according to claim 5, wherein the value of $\alpha$ is initially set at either 0 or 1.

7. A control system as claimed in claim 1, wherein the tuner employs a LMS function.

8. A control system as claimed in claim 1, wherein the tuner employs a RLS function.

9. A control system as claimed in claim 1, wherein the tuner is configured to adjust the scaling factors to minimize prediction of a control error.

10. A control system as claimed in claim 1, wherein the control system comprises an moving average controller for placing the zeros of the transfer functions of one or more of the controllers.

11. A control system according to claim 10, wherein an output of the moving average (MA) controller is provided to the tuner.

12. A control system as claimed in claim 11, wherein an output of the MA controller is provided to a conditioning filter before the tuner.

13. A control system as claimed in claim 1, wherein the control system comprises an AR controller for placing the poles of the transfer functions of one or more of the controllers.

14. A control system according to claim 1, wherein the control system is implemented digitally.

15. A power converter comprising the control system of claim 1.

16. A power converter according to claim 15, wherein the DC-DC converter has a topology selected from one of: a) a buck converter, b) a boost converter, c) a buck-boost converter, d) a buck converter, e) a flyback converter, and f) a forward converter.

17. An adaptive controller for controlling an output voltage of a DC-DC converter the adaptive controller comprising:

a first non-adaptive controller suitable for controlling the output voltage and providing a first control signal, a second non-adaptive controller suitable for controlling the output voltage and providing a second control signal, a first gain element for scaling the first control signal with a first scaling factor to provide a scaled first control signal, a second gain element for scaling the second control signal with a second scaling factor to provide a scaled second control signal, a summer for summing the scaled first and scaled second control signals, wherein the adaptive controller is configured to adjust a balance between the scaling factors whilst maintaining the sum of their scaling values constant and wherein the scaling factors are determined by minimizing a mean square value of a signal in the control system.

18. A method for adaptively controlling an output of a DC-DC converter, the method comprising the steps of: selecting a first controller for implementing a first control function; selecting a second controller for implementing a second control function; installing said first and said second controllers; applying the first control function to obtain a first control signal for maintaining the DC-DC converter output at a desired value, applying the second control function to obtain a second control signal for maintaining the DC-DC converter output at a constant desired value, balancing the first and second control signals to provide a balanced control signal, applying the balanced control signal to the DC-DC converter to maintain the output at the desired value, and adjusting the balance between the first and second control signals so as to find an optimum balance position whilst seeking to maintain the output from the DC-DC converter constant and wherein scaling factors for the first and second control signals are determined by minimizing a mean square value of a signal in the control system.

* * * * *